(12) United States Patent
Stephens et al.

(10) Patent No.: US 11,188,460 B2
(45) Date of Patent: Nov. 30, 2021

(54) ARENA-BASED MEMORY MANAGEMENT

(71) Applicant: Microsoft Technology Licensing, LLC, Redmond, WA (US)

(72) Inventors: Maoni Zhang Stephens, Kirkland, WA (US); Patrick H. Dussud, Redmond, WA (US); Peter F. Sollich, Munich (DE)

(73) Assignee: Microsoft Technology Licensing, LLC, Redmond, WA (US)

( * ) Notice: Subject to any disclaimer, the term of this patent is extended or adjusted under 35 U.S.C. 154(b) by 242 days.

(21) Appl. No.: 16/011,245

(22) Filed: Jun. 18, 2018

(65) Prior Publication Data
US 2019/0384703 A1    Dec. 19, 2019

(51) Int. Cl.
*G06F 12/02*    (2006.01)

(52) U.S. Cl.
CPC ...... *G06F 12/0253* (2013.01); *G06F 12/0246* (2013.01); *G06F 2212/1044* (2013.01); *G06F 2212/7205* (2013.01)

(58) Field of Classification Search
CPC .................................................. G06F 12/0253
See application file for complete search history.

(56) References Cited

U.S. PATENT DOCUMENTS

| | | | |
|---|---|---|---|
| 2004/0158589 A1* | 8/2004 | Liang | G06F 11/3466 |
| 2012/0323979 A1* | 12/2012 | Basu | G06F 12/0269 707/813 |
| 2019/0303280 A1* | 10/2019 | Masputra | G06F 9/52 |

OTHER PUBLICATIONS

Clarke, et al., "Compacting Garbage Collection can be Fast and Simple", In Journal of Software: Practice and Experience, vol. 26, Issue 2, Feb. 1, 1996, pp. 177-194.
"International Search Report and Written Opinion Issued in PCT Application No. PCT/US19/036435", dated Sep. 30, 2019, 10 Pages.

* cited by examiner

*Primary Examiner* — Van H Oberly
(74) *Attorney, Agent, or Firm* — Dicke, Billig & Czaja, PLLC

(57) ABSTRACT

An arena-based memory management system is disclosed. In response to a call to reclaim memory storing a plurality of objects allocated in an arena, a garbage collection of the arena is triggered based on heap-related parameter. A live object of the plurality of objects is preserved with the garbage collection.

20 Claims, 2 Drawing Sheets

300

IN RESPONSE TO CALL TO RECLAIM MEMORY IN AN ARENA, TRIGGER GARBAGE COLLECTION BASED ON HEAP-RELATED PARAMETER
302

PRESERVE LIVE OBJECTS IN THE ARENA WITH THE GARABAGE COLLECTION
304

Fig. 2
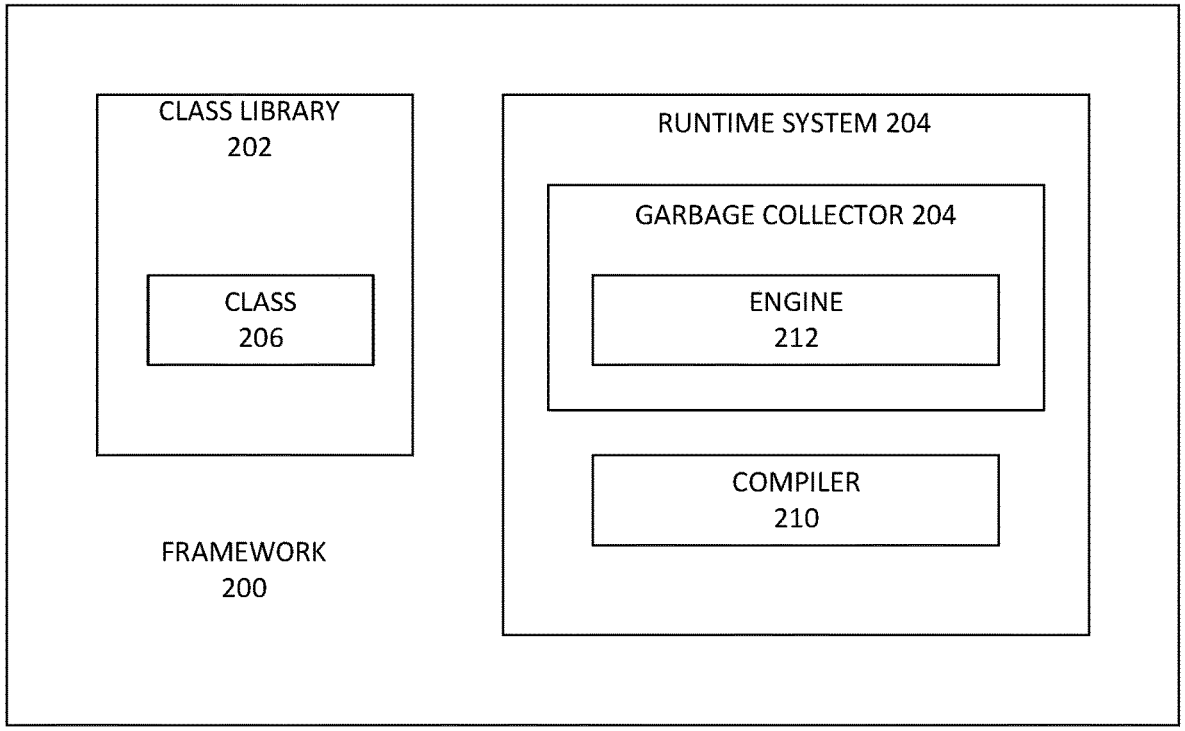
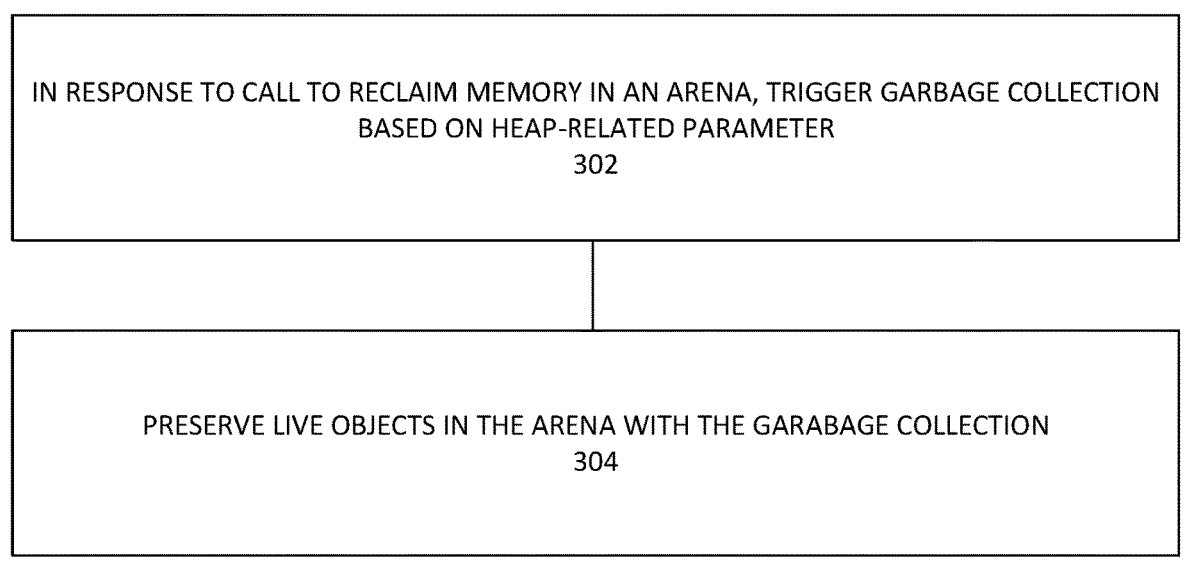
Fig. 3

ARENA-BASED MEMORY MANAGEMENT

BACKGROUND

Two common memory management techniques in computer systems include manual memory management and garbage collection. Manual memory management includes programmer-explicit allocation and deallocation of memory, such as with the malloc( ) and free( ) functions in the standard library of the C programming language or the new and delete operators in the C++ programming language. Garbage collection is a form of automatic memory management that attempts to detect objects no longer used by software applications or programs on the computer system and to recover memory occupied by the objects that are no longer used by software applications or programs running on the computing system. Another memory management technique is arena-based memory allocation. Arena-based memory management techniques have also been referred to as region-based, zone-based, and group-based memory techniques. In an arena-based memory management system, each allocated object is placed in a program-specified arena. Memory is reclaimed by destroying the arena and freeing all the allocated objects in the arena. Often, arenas are explicit in the software application and under programmer control.

SUMMARY

This summary is provided to introduce a selection of concepts in a simplified form that are further described below in the Description. This summary is not intended to identify key features or essential features of the claimed subject matter, nor is it intended to be used to limit the scope of the claimed subject matter.

The disclosure relates to the timing of deallocating or freeing objects in an arena. The arena is under control of the program as opposed to a managed heap in which a garbage collector determines whether an object is no longer live and reclaim the memory used. Typically, an arena is reclaimed when the user calls an application programming interface, or API, in the framework to deallocate or free objects in the arena. The disclosure includes a mechanism to delay the deallocation of the arena based on the total usage of all arenas in the system that can make freeing objects more efficient including circumstances in which the program attempts to free live objects. An arena marked for deallocation is held until a heap-based parameter, such as a selected memory load or ratio of arena size to heap size, surpasses a threshold. The arena marked for deallocation is garbage collected and live objects are preserved.

In one example, the disclosure provides for an arena-based memory management system. In response to a call to reclaim memory storing a plurality of objects allocated in an arena, a garbage collection of the arena is triggered based on heap-related parameter. A live object of the plurality of objects is preserved with the garbage collection.

BRIEF DESCRIPTION OF THE DRAWINGS

The accompanying drawings are included to provide a further understanding of embodiments and are incorporated in and constitute a part of this disclosure. The drawings illustrate embodiments and together with the description serve to explain principles of embodiments. Other embodiments and many of the intended advantages of embodiments will be readily appreciated, as they become better understood by reference to the following description. The elements of the drawings are not necessarily to scale relative to each other. Like reference numerals designate corresponding similar parts.

FIG. 2 is a block diagram illustrating an example arena-based memory management framework for execution in the computing device of FIG. 1.

FIG. 3 is a block diagram illustrating an example method of the arena-based memory management framework of FIG. 2.

DESCRIPTION

Figure 1:
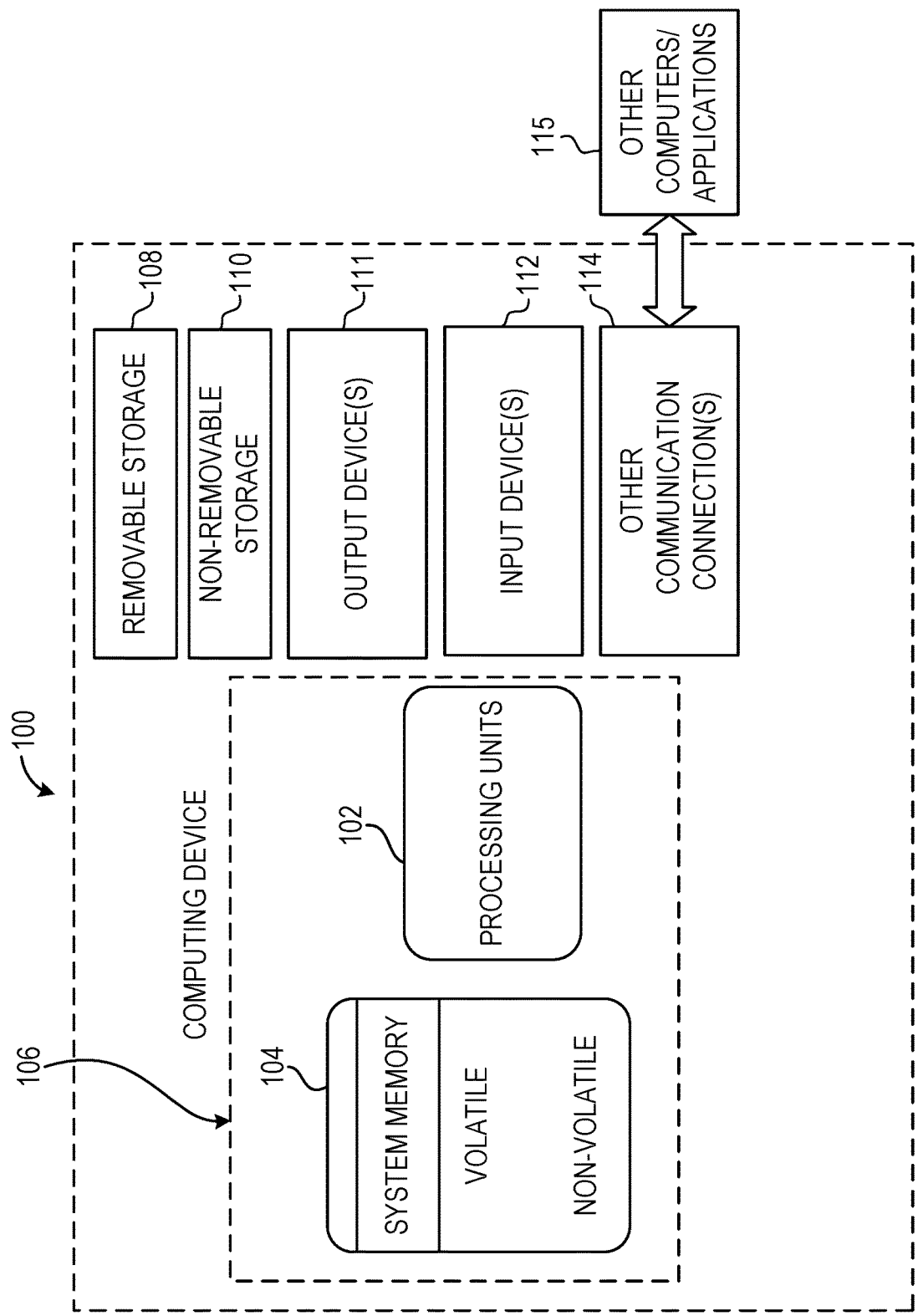
FIG. 1 is a block diagram illustrating an example of a computing device, which can be configured in a computer network to provide, for example, a cloud-computing environment.

In the following Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following description, therefore, is not to be taken in a limiting sense. It is to be understood that features of the various example embodiments described herein may be combined, in part or whole, with each other, unless specifically noted otherwise.

FIG. 1 illustrates an exemplary computer system that can be employed in an operating environment and used to host or run a computer application included on one or more computer readable storage mediums storing computer executable instructions for controlling the computer system, such as a computing device, to perform a process. An example of a computer-implemented process includes a concurrent garbage collection that can be stored in a computer memory and executed with a processor to be triggered based on a dynamically tunable parameter based on a previous garbage collection.

The exemplary computer system includes a computing device, such as computing device 100. In a basic hardware configuration, computing device 100 typically includes a processor system having one or more processing units, i.e., processors 102, and memory 104. By way of example, the processing units may include two or more processing cores on a chip or two or more processor chips. In some examples, the computing device can also have one or more additional processing or specialized processors (not shown), such as a graphics processor for general-purpose computing on graphics processor units, to perform processing functions offloaded from the processor 102. The memory 104 may be arranged in a hierarchy and may include one or more levels of cache. Depending on the configuration and type of computing device, memory 104 may be volatile (such as random access memory (RAM)), non-volatile (such as read only memory (ROM), flash memory, etc.), or some combination of the two. The computing device 100 can take one or more of several forms. Such forms include a tablet, a personal computer, a workstation, a server, a handheld device, a consumer electronic device (such as a video game console or a digital video recorder), or other, and can be a stand-alone device or configured as part of a computer network.

Computing device 100 can also have additional features or functionality. For example, computing device 100 may also include additional storage. Such storage may be removable and/or non-removable and can include magnetic or optical disks, solid-state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other storage medium that can be used to store the desired information and that can be accessed by computing device 100. Accordingly, a propagating signal by itself does not qualify as storage media. Any such computer storage media may be part of computing device 100.

Computing device 100 often includes one or more input and/or output connections, such as USB connections, display ports, proprietary connections, and others to connect to various devices to provide inputs and outputs to the computing device. Input devices 112 may include devices such as keyboard, pointing device (e.g., mouse, track pad), stylus, voice input device, touch input device (e.g., touchscreen), or other. Output devices 111 may include devices such as a display, speakers, printer, or the like.

Computing device 100 often includes one or more communication connections 114 that allow computing device 100 to communicate with other computers/applications 115. Example communication connections can include an Ethernet interface, a wireless interface, a bus interface, a storage area network interface, and a proprietary interface. The communication connections can be used to couple the computing device 100 to a computer network, which can be classified according to a wide variety of characteristics such as topology, connection method, and scale. A network is a collection of computing devices and possibly other devices interconnected by communications channels that facilitate communications and allows sharing of resources and information among interconnected devices. Examples of computer networks include a local area network, a wide area network, the Internet, or other network.

Computing device 100 can be configured to run an operating system software program and one or more computer applications, which make up a system platform. A computer application configured to execute on the computing device 100 includes at least one process (or task), which is an executing program. Each process provides the resources to execute the program. One or more threads run in the context of the process. A thread is the basic unit to which an operating system allocates time in the processor 102. The thread is the entity within a process that can be scheduled for execution. Threads of a process can share its virtual address space and system resources. Each thread can include exception handlers, a scheduling priority, thread local storage, a thread identifier, and a thread context, or thread state, until the thread is scheduled. A thread context includes the thread's set of machine registers, the kernel stack, a thread environmental block, and a user stack in the address space of the process corresponding with the thread. Threads can communicate with each other during processing through techniques such as message passing.

An operation may execute in a thread separate from the main application thread. When an application calls methods to perform an operation, the application can continue executing on its thread while the method performs its task. Concurrent programming for shared-memory multiprocessors can include the ability for multiple threads to access the same data. The shared-memory model is the most commonly deployed method of multithread communication. Multiple threads execute on multiple processors, multiple processor cores, multiple logical nodes in a single processor core, and/or other classes of parallelism that are attached to a memory shared between the processors.

The present disclosure relates generally to memory management techniques combining arena-based memory management systems with garbage collection used with programming languages or runtime systems in a data processing system such as computing device 100. Aspects of the present disclosure may be embodied as a system, method or computer program product. Accordingly, aspects of the present disclosure may take the form of entirely hardware, entirely software, including firmware, resident software, micro-code, or a combination of software and hardware aspects that may all generally be referred to as a system. Furthermore, aspects of the present disclosure may take the form of a computer program product including one or more computer readable medium or media having computer readable program instruction for causing a processor to carry out the aspects of the disclosure.

FIG. 2 illustrates features of an example software framework 200, which can be implemented on computing device 100. The framework 200 can be used with developer-written software applications created in one or more framework-compatible languages for one or more platforms. Example framework 200 includes a class library 202 having a runtime library and base class library and an application engine such as a runtime system 204, virtual machine, or software container. In one example, the class library 202 includes a set of classes organized by namespace to define features available in a framework-compatible programming language. In some implementations, software applications written in a framework-compatible language as source code are compiled into a platform-neutral language, or bytecode, that can be executed in a platform-specific virtual machine installed on the platform, such as computing device 100. The runtime system 204 compiles the bytecode into machine code that is executed on the platform. The runtime system 204 can provides additional services including memory management, type safety, exception handling, garbage collection, security and thread management. Upon execution of the developer-written program, a platform-specific just-in-time compiler 210 of the runtime system 204 translates the byte code into machine code. The compiler 210 can provide a combination of ahead-of-time compilation and interpretation, and the runtime system 204 can handle late-bound data types and enforce security guarantees.

Class library 202 of the example can include one or more class or classes 206 implemented in accordance with the methods disclosed. In general, a class 206 is an extensible program-code-template, or blueprint, for creating objects, providing initial values for state, and implementations of behavior. The class is a construct that enables a developer to create custom types by grouping together variables of other types, methods and events. Class or classes 206 may include class variables, instance variables, local variables, parameters, user-defined methods, inherited states and behaviors, and interfaces. The variable can remain in memory 104 until deleted with the arena-based memory management system. At that time, the runtime system 204 via garbage collector 208 can mark the variable as eligible for garbage collection.

The class library 202 may include functions or support operators that provide for arena-based memory management in which each allocated object is assigned to an arena. In one implementation, all objects in an area are allocated in a single contiguous range of memory addresses in memory 104. In one example, each arena is implemented as a data structure, such as a linked list, of a segment of memory, such as a large block of memory, in memory 104 in which each block can serve multiple allocations. The segment maintains a pointer to the next free position in the block, and if the block is filled, a new one is allocated and added to the list. When the arena is deallocated, the next-free-position pointer is reset to the beginning of the first block, and the list of blocks can be reused for the next arena to be created. Also, when an area is deallocated, the list of blocks can be appended to a global freelist from which other arenas may later allocate new blocks. Many operations may be performed to construct list, a single operation can deallocate the arena without having to traverse the list. The operations for allocation and deallocation can be implemented with simple functions in the library for programmer use. An arena-base memory management system includes the features and mechanism assign allocated objects to an arena and to deallocate the objects at once from the arena in this manner.

The runtime system 204 can allocate a segment of memory in memory 104 for arenas to store and manage objects. In one example, the segment of memory is a heap. (The "heap" in this disclosure is distinguishable from a native heap in the operating system.) In one example, there can be a heap for each process, and threads in the process allocate memory for objects on the same heap. In another example, the heap can be an accumulation of a large object heap, such as a heap that includes objects over a selected threshold in size, and a small object heap. The heap can include any number of noncontiguous chunks virtual memory, each including live blocks with objects interspersed with regions of free memory, or free space. The runtime system 204 can maintain a free list data structure, or physical free list, that indexes all of the free memory that has been allocated.

The runtime system 204 can include a garbage collector 208 to automatically manage the allocation and release of memory on the heap, or managed heap, for a software application. A garbage collector 208 attempts to detect objects no longer used by software applications on the computer system and to recover memory occupied by the objects that are no longer used by software applications running on the computing system. In one example, garbage collector 208 can provide a tracing garbage collection to determine which objects should be deallocated by tracing which objects are reachable by a chain of references from certain root objects, and collecting the rest of the objects, rather then by reference counting. The garbage collector 208 includes an optimizing engine 212 to determine the preferred time or occasion to perform a collection. The garbage collector 208 checks for objects in the segment of memory that are no longer being used by the application and performs the operations to reclaim the memory. Garbage collection can occur in response to a heap-related parameter such as when the system has low physical memory or if the memory used by allocated objects on the segment of memory surpasses an acceptable threshold.

Before a garbage collection starts, or is triggered, the managed threads can be suspended except for the thread that triggered the garbage collection. The garbage collector 208 can determine whether an object is live via information such as stack variables provided by a just-in-time compiler and stack walker, handles that point to managed objects and that can be allocated by user code or by the runtime, and from static objects in application domains that could be referencing other objects. Each application domain tracks its static objects. In one example, garbage collection can occur in a set of phases including marking phase that finds and creates a list of all live objects, a relocating phase that updates the references to the objects that will be compacted, and a compacting phase that reclaims the space occupied by the dead objects and compacts the surviving objects. The compacting phase moves objects that have survived a garbage collection toward the older end of the segment of memory. In one example, garbage collector 208 can be a mark and sweep collector that can find and create a list of all live objects, update references to objects that occupy memory to be compacted, reclaim address space occupied by dead objects, and compact surviving objects.

In one example, the framework 200 can allow for both garbage collection and arena-based memory management to co-exist in the same application by using separate memory segments for collected and arena-based managed objects. In one example, the class library 202 can include functions to allocate memory into an arena as well as objects in the arena, such as:

Arena.Create( );
Object arenaObj0=new Object( );
Object arenaObj1=new Object( );
Suspend allocating to the arena and allocate into a managed heap that is garbage collected via garbage collector 208 and then resume allocating into the arena:
Arena.Suspend( )
Object globalObj=new Object( )
MyGlobalVar.x=globalObj;
Arena. Resume( );
Object arenaObj2=new Object( );
Object arenaObj3=new Object( );
And then free the objects in the arena:
Arena. Delete( );

FIG. 3 illustrates an example method 300 for use with an arena-based memory management system, such as the framework 200 that supports the use of arenas for memory management and having garbage collector 208. In response to a call to reclaim memory storing a plurality of objects allocated in an arena, a garbage collection of the arena is triggered based on heap-related parameter at 302. In one example, the call to reclaim memory is delayed until the garbage collection is triggered based on the heap-related parameter. This can be in contrast with a typical arena collection, which reclaims the memory in direct response to the call. The heap-related parameter can be a typical garbage collection trigger. In the case of the method 300, however, the garbage collection does not occur until after the call to reclaim memory of the arena. This can be in contrast to a typical garbage collection, which can occur before a programmed deallocation. Examples of heap-related parameters can include a memory load that surpasses a threshold, a ratio of an arena size to a heap size that surpasses a threshold, a survival ratio of arena objects, or other triggers. The triggering of the garbage collection includes reclaiming the memory with the garbage collection.

A live object of the plurality of objects is preserved with the garbage collection at 304. In one example, the garbage collection is a tracing garbage collection and detects live objects that have been set to be freed. The garbage collection, in one example, can relocate the live object outside of the arena, such as in a section of the managed heap before the arena is deallocated. The typical implementation of arenas is unsafe as an arena can be deleted even if other arenas have accessible pointers to objects in the arena to be deleted. Rather than apply reference counters to prevent the arena from being deleted, the live object is relocated and the arena is deleted at 304. Accordingly, method 300 deletes the arena at an efficient point in the program, which may occur after the call to reclaim memory, and preserves live objects that may inadvertently remain in the arena to be deleted.

In one example, multiple calls to reclaim multiple arenas can be made before the garbage collection is triggered. The runtime system 204 can cue the calls with the optimizing engine 212 and reclaim the memory upon the garbage collection triggered based on the heap-related parameter. In the example, live objects that remain in the multiple arenas are relocated to the managed heap and preserved while the arenas are reclaimed.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein.

What is claimed is:

1. A method of controlling an arena-based memory management system, the method comprising:
    allocating a plurality of objects into an arena in memory from a programmed allocation in an application, the arena reclaimable after a programmed deallocation in the application, the memory including the arena and a segment for collected managed objects;
    triggering a garbage collection of the collected managed objects in response to a heap- related parameter of the segment for collected managed objects;
    in response to a call in the application to reclaim memory storing a plurality of objects allocated in the arena, deallocating the arena with the garbage collection, the deallocation delayed until the garbage collection is triggered; and
    preserving a live object of the plurality of objects with the garbage collection.

2. The method of claim 1 wherein the heap-related parameter includes a memory load that surpasses a threshold.

3. The method of claim 1 wherein the heap-related parameter includes a ratio of an arena size to a heap size that surpasses a threshold or a survival ratio of arena objects.

4. The method of claim 1 wherein the triggering of the garbage collection includes reclaiming the memory with the garbage collection.

5. The method of claim 1 wherein the triggering the garbage collection is in response to a plurality of calls to reclaim memory in a plurality of arenas.

6. The method of claim 5 wherein the preserving the live object includes preserving a plurality of live objects in the plurality of arenas.

7. The method of claim 1 wherein the heap-based parameter delays the triggering the garbage collection in response to the call to reclaim memory.

8. The method of claim 7 wherein the heap-based parameter delays the triggering the garbage collection in response to a plurality of calls to reclaim memory.

9. The method of claim 1 wherein the live object includes an accessible pointer from another arena.

10. The method of claim 1 wherein the garbage collection includes a tracing garbage collection.

11. The method of claim 1 wherein the preserving the live object includes comprising relocating the live object out of the arena.

12. An arena-based memory management system, comprising:
    a memory device to store a set of instructions; and
    a processor to execute the set of instructions to:
    allocate a plurality of objects into an arena in memory from a programmed allocation in an application, the arena reclaimable after a programmed deallocation in the application, the memory including the arena and a segment for collected managed objects;
    trigger a garbage collection of the collected managed objects in response to a heap-related parameter of the segment for collected managed objects;
    in response to a call in the application to reclaim memory storing a plurality of objects allocated in the arena, deallocate the arena with the garbage collection, deallocation delayed until the garbage collection is triggered; and
    preserve a live object of the plurality of objects with the garbage collection.

13. The system of claim 12 wherein the heap-related parameter is based on a capacity of heap memory.

14. The system of claim 13 wherein the wherein the heap-related parameter includes a memory load that surpasses a threshold.

15. The system of claim 13 wherein the arena occupies a size that is a percentage of the heap.

16. The system of claim 12 wherein the heap-based parameter delays the trigger of the garbage collection in response to a plurality of calls to reclaim memory.

17. The system of claim 12 wherein the trigger of the garbage collection includes reclamation of the memory with the garbage collection.

18. A computer readable device to store computer readable instructions to control a processor to control an arena-based memory, the instructions comprising:
    allocate a plurality of objects into an arena in memory from a programmed allocation in an application, the arena reclaimable after a programmed deallocation in the application, the memory including the arena and a segment for collected managed objects;
    trigger a garbage collection of the collected managed objects in response to a heap-related parameter of the segment for collected managed objects;
    in response to a call in the application to reclaim memory storing a plurality of objects allocated in the arena, deallocate the arean with the garbage collection, the deallocation delayed until the garbage collection is triggered; and
    preserve a live object of the plurality of objects with the garbage collection.

19. The computer readable device of claim 18 wherein the heap-related parameter is based on a capacity of heap memory.

20. The computer readable device of claim 18 wherein the live object is relocated in a heap out of the arena.

* * * * *